US012605024B2

(12) United States Patent
Hocquel et al.

(10) Patent No.: US 12,605,024 B2
(45) Date of Patent: Apr. 21, 2026

(54) COLLECTING BAG FOR A SUCTION APPARATUS

(71) Applicant: Andreas Stihl AG & Co. KG, Waiblingen (DE)

(72) Inventors: Michael Hocquel, Riederich (DE); Alexander Fuchs, Bietigheim-Bissingen (DE); Andreas Rieger, Kaisersbach-Ebni (DE); Markus Oesterle, Althuette (DE); Markus Pfeifer, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 227 days.

(21) Appl. No.: 18/466,513

(22) Filed: Sep. 13, 2023

(65) Prior Publication Data

US 2024/0081593 A1     Mar. 14, 2024

(30) Foreign Application Priority Data

Sep. 13, 2022    (DE) ..................... 10 2022 123 371.5

(51) Int. Cl.
*A01D 43/06*          (2006.01)
*A01D 43/063*         (2006.01)
*A47L 9/14*           (2006.01)

(52) U.S. Cl.
CPC .......... *A47L 9/149* (2013.01); *A01D 43/0636* (2013.01)

(58) Field of Classification Search
CPC ........... A47L 9/14; A47L 9/149; B65D 33/01; A01D 43/0636

(Continued)

(56) References Cited

U.S. PATENT DOCUMENTS 4,126,986 A * 11/1978 Kidd ..................... A01D 43/063
                                                        56/16.6
4,344,274 A * 8/1982 Heismann ............ A01D 43/063
                                                        383/42

(Continued)

FOREIGN PATENT DOCUMENTS

EP          3 298 942 A1     3/2018
WO       2005/063590 A1     7/2005

OTHER PUBLICATIONS

Written Opinion and Preliminary Research Report of the French Industrial Property Department dated Apr. 4, 2025 in corresponding French application 2309536.

*Primary Examiner* — Nathan J Newhouse
*Assistant Examiner* — Nina K Attel
(74) *Attorney, Agent, or Firm* — Walter Ottesen, P.A.

(57)                ABSTRACT

A collecting bag is for receiving material to be collected and has a receiving space delimited by a woven-fabric cloth and is delimited by outer edges of the collecting bag. The woven-fabric cloth of the collecting bag is at least partially air-permeable. The receiving space has an inlet opening for a conveying airflow which supplies the material to be collected, and an outlet opening for at least partially discharging the conveying airflow into the environment. The inlet opening is provided on a first edge of the collecting bag, and the emptying opening is provided on a second edge. The first and second edges are opposite one another at a spacing and are interconnected via longitudinal edges of the collecting bag. The outlet opening for at least partially discharging the conveying airflow is disposed in a side wall of the collecting bag, between the emptying opening and the inlet opening.

20 Claims, 4 Drawing Sheets

(58) Field of Classification Search
USPC .......... 383/100, 102, 103, 117; 55/361, 367,
55/368; 210/167.17; 56/202
See application file for complete search history.

(56) References Cited

U.S. PATENT DOCUMENTS

| | | | |
|---|---|---|---|
| 5,240,484 A * | 8/1993 | Genovese .......... | B01D 46/0043 422/294 |
| 5,379,810 A * | 1/1995 | Marino ................. | B08B 17/025 141/10 |
| 6,029,312 A | 2/2000 | Whitney | |
| 6,546,710 B1 * | 4/2003 | DeHart ................ | A01D 43/063 56/202 |
| 9,320,396 B2 | 4/2016 | Reynolds et al. | |
| 11,045,056 B2 | 6/2021 | Poole et al. | |

* cited by examiner

COLLECTING BAG FOR A SUCTION APPARATUS

CROSS-REFERENCE TO RELATED APPLICATIONS

This application claims priority of German patent application no. 10 2022 123 371.5, filed Sep. 13, 2022, the entire content of which is incorporated herein by reference.

TECHNICAL FIELD

The disclosure relates to a collecting bag for use with a suction apparatus for vacuuming material to be collected, such as leaves, dirt, or the like. The collecting bag for receiving the material to be collected is formed by a woven-fabric cloth which forms an inner receiving space which is delimited by outer edges of the collecting bag. The woven-fabric cloth is at least partially air-permeable so that the conveying airflow which conjointly with the material to be collected flows into the receiving space can flow out. In order for the conveying airflow conjointly with the material to be collected to enter, the collecting bag has an inlet opening, wherein the collecting bag has an outlet opening for at least partially discharging the conveying airflow into the environment. The material to be collected which has been collected in the collecting bag is emptied by way of a closable emptying opening.

BACKGROUND

Receiving the material to be collected depends inter alia on the degree of dryness thereof. Dry leaves can be readily vacuumed, while wet leaves can be vacuumed only with difficulty. The suction apparatus operates at a consistent output, wherein the suction apparatus is conceived such that wet leaves can also be effectively vacuumed. Depositing the material to be collected in the receiving space likewise depends very much on the state of dampness of the material to be collected. Wet material to be collected is often deposited already close to the inlet opening and builds up, as a result of which the volume of the receiving space can often not be effectively utilized, in particular in the case of wet leaves.

SUMMARY

The disclosure is based on the object of configuring the collecting bag for a suction apparatus in such a manner that wet as well as dry material to be collected can be effectively vacuumed and stored in the receiving space up to a high filling level.

The object is, for example, achieved by a specific configuration of the collecting bag. The inlet opening into the receiving space is provided on a first edge of the collecting bag, while the emptying opening is configured on an opposite second edge of the collecting bag. The first edge and the second edge of the collecting bag are mutually opposite at a spacing and are connected to one another by way of longitudinal edges of the collecting bag. The outlet opening for at least partially discharging the conveying airflow is configured in a side wall of the collecting bag. In spatial terms, the outlet opening is provided in the side wall, between the emptying opening and the inlet opening.

A higher filling level of the receiving space is achieved by the disposal of the outlet opening according to the disclosure, independently of the material to be collected that has to be vacuumed, so that long operating times are possible with the collecting bag according to the disclosure until emptying is necessary. Filling of the collecting bag starts in the region of the closed emptying opening and continues towards the inlet opening as the operating time progresses. An effective utilization of the receiving space is thus provided.

In an embodiment of the disclosure it is provided that the outlet opening has an area which corresponds to 10% to 20% of the area of the side wall of the collecting bag. A configuration of the area of the outlet opening having 15% of the area of the side wall is particularly advantageous.

If the collecting bag between the first edge thereof and the second edge thereof is divided into two halves by an imaginary central plane, the disposal of the outlet opening is provided in such a manner that the outlet opening is configured in the one half of the collecting bag, and the inlet opening is configured in the other half of the collecting bag. The outlet opening advantageously lies closer to the emptying opening of the collecting bag than to the inlet opening of the collecting bag.

In the side wall of the collecting bag, the outlet opening is formed by a fabric net which is held in the side wall of the collecting bag. The fabric net has a mesh size which ensures that coarse material to be collected is retained on the one hand, and on the other hand guarantees that air passes through with little flow resistance. The fabric net of the outlet opening has an air permeability which is higher, in particular multiple times higher, than the air permeability of the woven-fabric cloth of the collecting bag. The air permeability of the woven-fabric net is 20 to 200 times greater than the air permeability of the woven-fabric cloth.

In an embodiment of the disclosure it is provided that the outlet opening is assigned a closure element which in a closure position completely closes the outlet opening. In particular, the closure element in the closure position closes the outlet opening in an air-tight manner.

The closure element is advantageously provided as a closure cloth which covers the fabric net of the outlet opening in a planar manner and in particular completely. The closure cloth which covers the outlet opening is attached to the side wall of the collecting bag, preferably fixedly stitched thereto, by way of a majority of the circumference of the closure cloth. A circumferential portion of the closure cloth, which is not attached, forms an outflow opening. The outflow opening preferably faces a longitudinal edge of the collecting bag. The outflow opening is expediently able to be closed by a closing flap. The closing flap is advantageously fixed to the side wall of the collecting bag.

In a particular embodiment, the opening edge of the closure element that delimits the outflow opening is reinforced with a flat bar. The flat bar in the longitudinal direction thereof is divided into at least two mutually separate segments. As a result of this configuration of the opening edge, stable opening of the outflow opening by an exiting airflow is achieved on the one hand, and mechanically strong closing of the stiffened opening edge on the other hand.

In a further embodiment, at least one opening edge of the emptying opening is reinforced with a flat bar. The emptying opening extends across the entire height of the edge of the collecting bag. The flat bar in terms of the length thereof is configured so as to be adapted to equal the length of the opening edge, wherein the flat bar in the longitudinal direction thereof is divided into at least two mutually separate segments. As a result, the open position can be reinforced when the emptying opening is open. In order for the emptying opening to be closed, the reinforced opening edge is to be folded back about at least one fold and to be fixed when folded. The flat bar stabilizes the closed state of the emptying opening.

The fundamental shape of the collecting bag is configured such that the latter in the lateral view has a substantially rectangular shape having first and second edges which are configured on the narrow sides, and longitudinal edges which are configured on the longitudinal sides. The spacing between the inlet opening in the first edge and the emptying opening in the second edge is thus larger, in particular multiple times larger, than the mutual spacing of the two longitudinal edges.

With a view to a high filling level it is provided that the collecting bag, proceeding from the edge with the inlet opening is configured so as to widen in the direction toward the edge with the emptying opening. This facilitates the accumulation of the vacuumed material to be collected in the region of the emptying opening.

In order to further increase effective filling of the receiving space, it is provided that the inlet opening in the first edge is extended in length by an inner channel section of a defined length that opens into the collecting bag. The channel section expediently widens in the flow direction from the inlet opening towards the receiving space. In particular, the inner channel section, which adjoins the inlet opening, as a diffusor opens into the receiving space. This results in the distribution of the conveying airflow entering the collecting space, with the consequence that the material to be collected is uniformly deposited in the receiving space. The filling level of the receiving space over the operating time is improved.

BRIEF DESCRIPTION OF DRAWINGS

The invention will now be described with reference to the drawings wherein.

DETAILED DESCRIPTION

Figure 1:
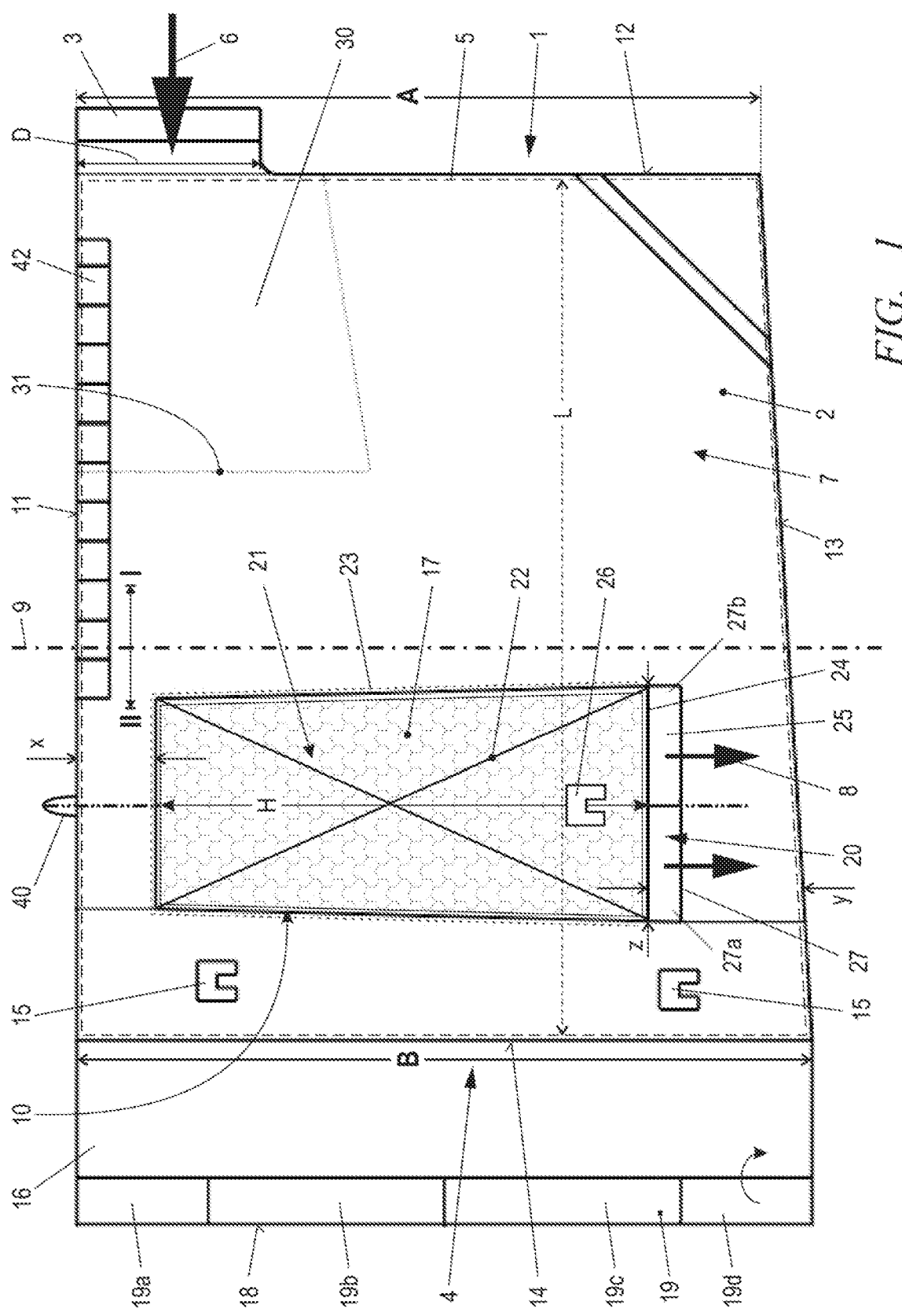
FIG. 1 shows a schematic lateral view of a collecting bag according to the disclosure made from an air-permeable woven-fabric cloth.

A collecting bag 1 according to the disclosure is schematically illustrated in a lateral view in FIG. 1. The collecting bag 1, which in particular includes an air-permeable woven-fabric cloth 2, has a rectangular basic shape. The narrow sides of the rectangular basic shape form a first edge 12 and a second edge 14 which are mutually opposite at a spacing. The first edge 12 and the opposite second edge 14 are connected to one another by way of longitudinal edges 11 and 13. At the same time, the longitudinal edges 11 and 13 form the longitudinal edges of the rectangular basic shape. The edges 12 and 14, and the longitudinal edges 11 and 13, delimit the receiving space 5 which lies in the collecting bag 1.

The inlet opening 3 for a conveying airflow 6 is configured on the first edge 12. The blower tube of a suction apparatus not illustrated in more detail is connected to the inlet opening 3. As is shown in FIG. 1, the inlet opening 3 is disposed close to the upper longitudinal edge 11. In the embodiment shown, the inlet opening 3 lies in the corner between the upper longitudinal edge 11 and the first edge 12. The inlet opening 3 has a diameter D which corresponds to approximately 20 to 30% of the height A of the first edge 12. The diameter D advantageously corresponds to 25% of the height A of the first edge 12.

The emptying opening 4 is configured in the opposite second edge 14. As is shown in FIG. 1, the emptying opening 4 extends across the entire height B of the second edge 14. It can furthermore be derived from FIG. 1 that the height A of the first edge 12 is smaller than the height B of the second edge 14. The collecting bag 1, proceeding from the first edge 12 widens in the direction towards the second edge 14 with the emptying opening 4.

An outlet opening 10 is provided in the side wall 7 of the collecting bag 1. The outlet opening 10 serves for at least partially discharging the conveying airflow 6 in sub-flows 8. The partial discharge of the conveying airflow 8 through the outlet opening 10 is indicated by sub-flows 8 in FIG. 1. The sum of the sub-flows 8 is less than the conveying airflow 6.

The outlet opening 10 lies between the emptying opening 4 and the inlet opening 3. If the collecting bag 1 between the first edge 12 thereof and the second edge 14 thereof is divided into two halves I and II by an imaginary central plane 9, the outlet opening 10 lies in the one half II of the collecting bag 1, and the inlet opening 4 lies in the other half I of the collecting bag 1. It is advantageously provided that the outlet opening 10 lies closer to the emptying opening 4 than to the inlet opening 3 of the collecting bag 1.

The outlet opening 10 has a size which corresponds to approximately 10% to 20% of the overall area of the side wall 7 of the collecting bag 1. The outlet opening 10 advantageously forms approximately 14% of the overall area of the side wall 7.

As is shown in FIG. 1, the outlet opening 10 has a slightly trapezoidal basic shape which is at a spacing x from the upper longitudinal edge 11. The basic shape widens in the direction towards the lower longitudinal edge 13, the baseline of the basic shape being at a spacing y from the lower longitudinal edge 13. The height H of the outlet opening 10, lying parallel to the edges 12 and 14, is approximately 60% to 80% of the height B of the collecting bag 1 on the second edge 14, in particular 70% of the height B of the collecting bag 1 on the second edge 14. The maximum width z of the outlet opening is approximately 20% to 30% of the length L of the collecting bag 1, preferably 25% of the length L of the collecting bag 1. The length L of the collecting bag 1 corresponds to the spacing between the first edge 12 and the second edge 14.

The outlet opening 10 is formed by a fabric net 17 which is held in the side wall 7 of the collecting bag 1. In a particular configuration embodiment of the outlet opening 10, the outlet opening 10 is assigned a closure element 21 which in a closure position completely closes the outlet opening 10, in particular closes the latter in an air-tight manner.

As is schematically illustrated in FIG. 1, the closure element 21 includes a closure cloth 22 which covers the fabric net 17 in a planar manner. In the embodiment shown, the closure cloth 22 by way of a majority of the circumference 23 of the latter is fastened to the side wall 7, in particular stitched thereto. That portion of the circumference 23 that is not fastened to the side wall 7 limits an outflow opening 20. As is shown in FIG. 1, the outflow opening 20 faces the lower longitudinal edge 13 of the collecting bag 1.

The sub-flows 8 of the conveying airflow 6 that exit the outflow opening 20 thus face the ground or a corresponding floor surface.

The outflow opening 20 has an opening edge 24 which can be covered by a closing flap 25 in order to close the outflow opening 20. The closing flap 25 is advantageously attached to the side wall 7 of the collecting bag 1 below the outflow opening 20. The closing flap 25 expediently supports an eyelet, loop, or the like, which in the closing position can be attached to a hook 26 of the closure element 21. As a result, the closing position of the outflow opening 20 is secured.

In order to stabilize an open position of the outflow opening 20 on the one hand, and to guarantee a reliable closing position of the outflow opening 20 on the other hand, it is provided that the opening edge 24 of the closure element 21, in the embodiment of the closure cloth 22, that delimits the outflow opening 20 is reinforced with a flat bar 27. The flat bar 27 extends across the entire width z of the outflow opening 20. In the longitudinal direction of the flat bar 27 the latter is advantageously divided into two mutually separate segments 27a and 27b. The concept of reinforcing the opening edge 24 with a flat bar 27 divided into segments 27a, 27b is also explicitly disclosed as an independent concept.

The independent concept of reinforcing the edge of an opening by means of a divided flat bar is particularly advantageous also in the case of the emptying opening 4. As is shown in FIG. 1, the opening edge 18 is reinforced with a divided flat bar 19 across the height B of the emptying opening 4. The flat bar 19 in the longitudinal direction thereof has mutually separate segments 19a, 19b, 19c and 19d. The segments 19a, 19b, 19c and 19d can be configured with different lengths. In the embodiment shown, the central segments 19b and 19c are longer than the outer segments 19a and 19d. The central segments 19b and 19c are advantageously of identical lengths. In FIG. 1, an opening edge 18 is reinforced with a flat bar 19. It may be advantageous for the mutually opposite opening edges of the emptying opening 4 each to be reinforced with a segmented flat bar 19.

The collecting bag 1 has a closure portion 16 which adjoins the second edge 14 and is folded inwards in order to close the emptying opening 4. To this end, the opening edge 18, which is reinforced with the divided flat bar 19, is folded back, a first closure fold being formed as a result. The width of the closure portion 16, measured in the longitudinal direction of the collecting bag 1, is provided in such a manner that the closure portion 16 is folded inwards by being folded back three times, and in the closing position thereof can be attached to a hook 15 of the collecting bag 1 by an eyelet, loop, or the like. The closing position of the emptying opening 4 is secured as a result.

In the embodiment as per FIG. 1 it is furthermore provided that the inlet opening 3 is extended in length by an inner channel section 30 which opens into the receiving space 5 of the collecting bag 1. The channel section 30 has a channel length K which corresponds to approximately 30% to 40% of the length L of the receiving space 5 configured in the collecting bag 1. The channel length K advantageously corresponds to 35% of the length L of the receiving space 5.

As is shown in FIG. 1, the channel section 30 widens from the inlet opening 3 to the channel opening 31 into the receiving space 5. Widening of the channel section 30, starting at the inlet opening 3 towards the channel opening 31, by 10% to 20%, in particular by 15%, is advantageous. The configuration is advantageously chosen in such a way that the inner channel section 30, which adjoins the inlet opening 3, as a diffusor opens into the receiving space 5 of the collecting bag 1.

The collecting bag 1 advantageously has a carrying loop 40 for attaching a carrying strap 41 (FIG. 2), which is fastened at the upper longitudinal edge 11. The carrying loop 40 lies in particular so as to be centric above the outlet opening 10. Furthermore, in the region of the upper longitudinal edge 11 a reinforcing band 42 can be sewn in, which can also expediently include a carrying loop.

Figure 2:
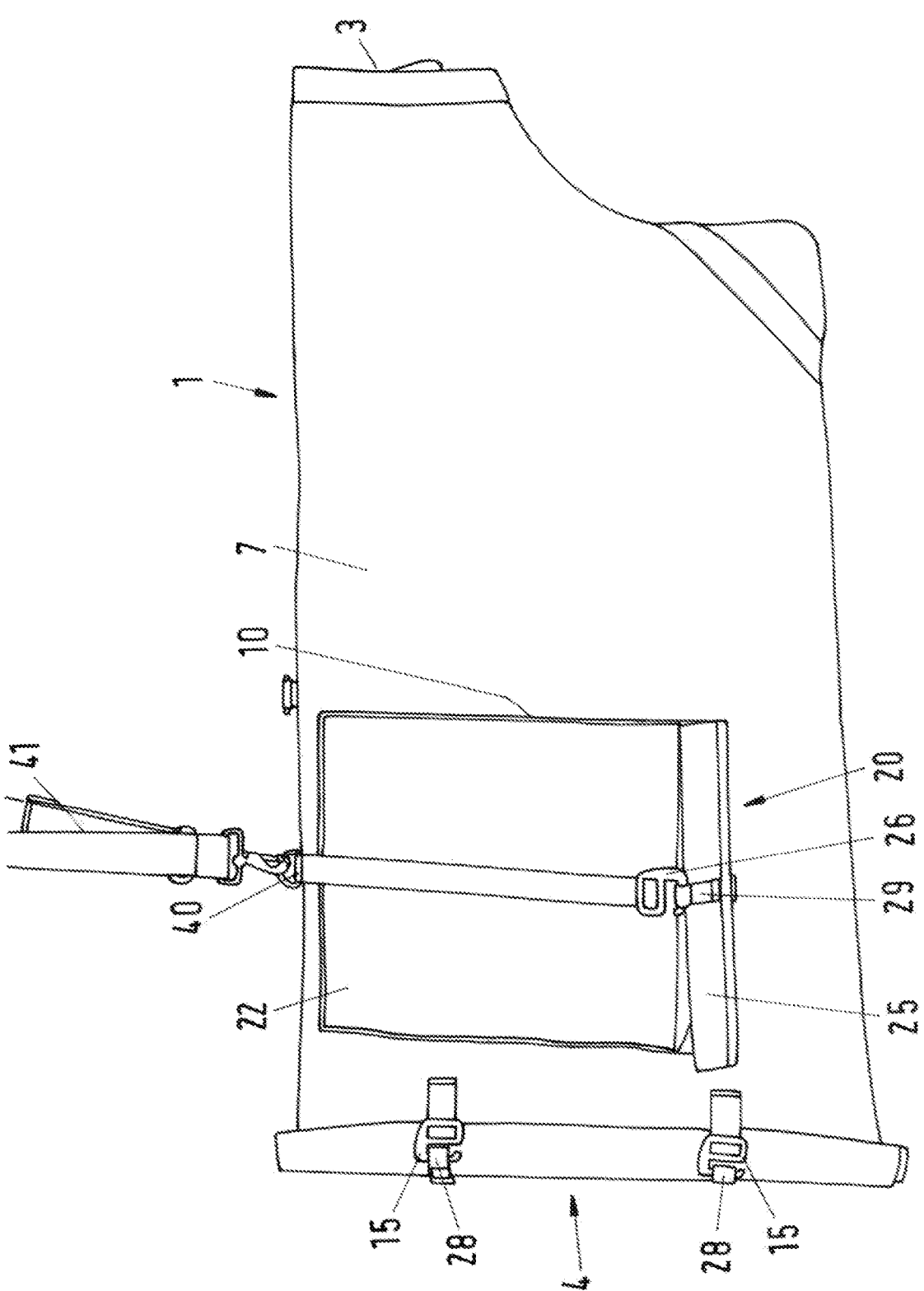
FIG. 2 shows a schematic illustration of the collecting bag according to the disclosure, with a closed outlet opening and a closed emptying opening.

Shown in FIG. 2 is the collecting bag 1 with the inlet opening 3 thereof, and the emptying opening 4 which has been closed by rolling up. Loops 28 which are fastened to the rear side of the collecting bag 1 are snapped into the hooks 15 of the collecting bag 1, as a result of which the closing position of the emptying opening 4 is secured.

Also shown in the illustration as per FIG. 2 is the outlet opening 10 in the closed position. The closing flap covers the outflow opening 20, wherein a loop 29 of the closing flap 25 is attached to the hook 26 of the closure cloth 22 and secures the closing position of the outflow opening 20.

Figure 3:
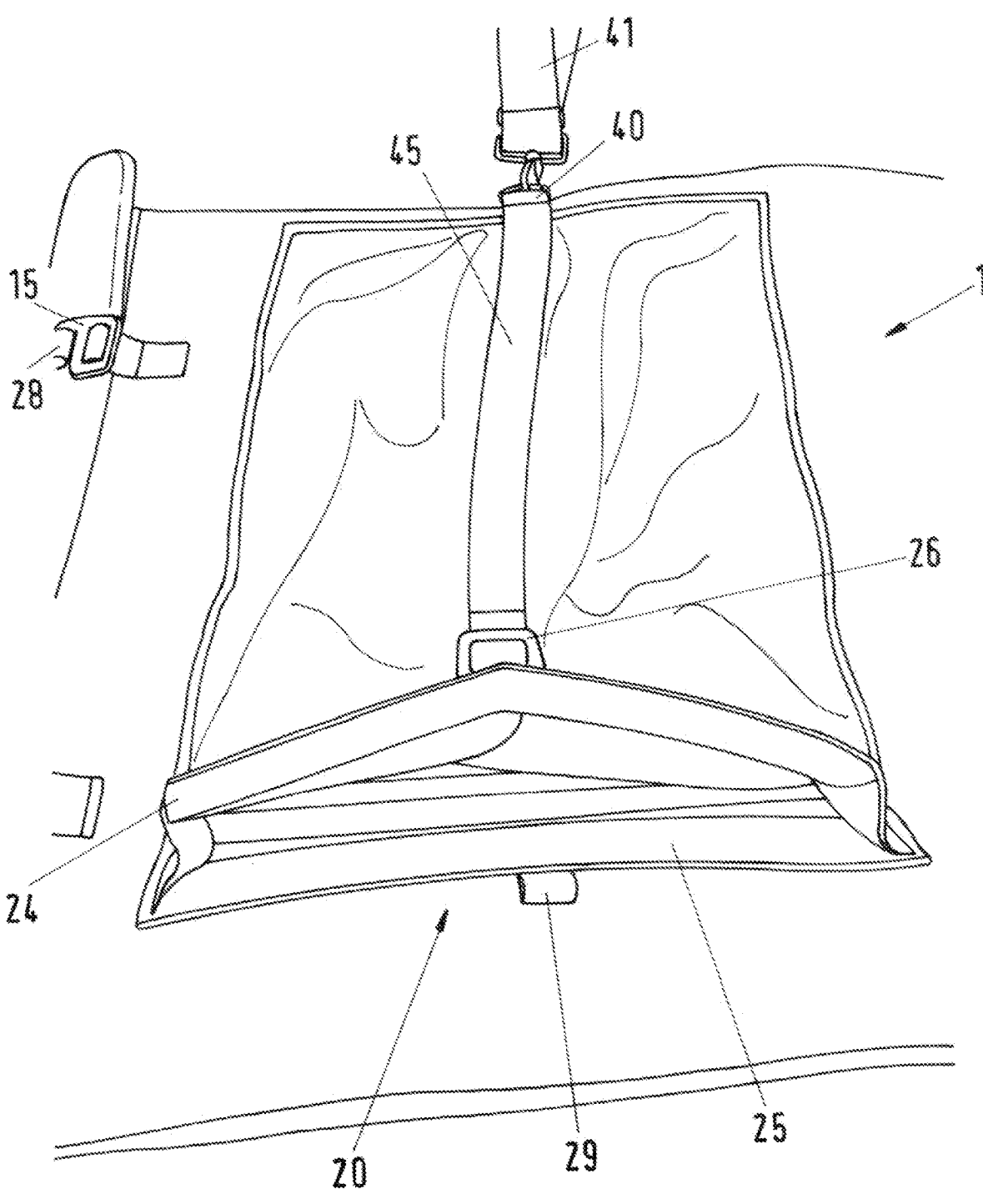
FIG. 3 shows a schematic illustration of the outlet opening provided in the side wall of the collecting bag, with an opened outflow opening; and, FIG. 4 shows a view of the opened emptying opening in a schematic illustration.

In FIG. 3, the outflow opening 20 of the outlet opening 10 is shown in the open position. The hook 26, which is fastened to the closure cloth 22, can expediently be fixed in an opening position with a securing strap 45. As is furthermore shown in FIG. 1 and FIG. 3, the division of the flat bar 27 lies in the region of the hook 26. A tensile force acting on the hook 26 thus causes the opening edge 24 to "kink" upwards.

Figure 4:
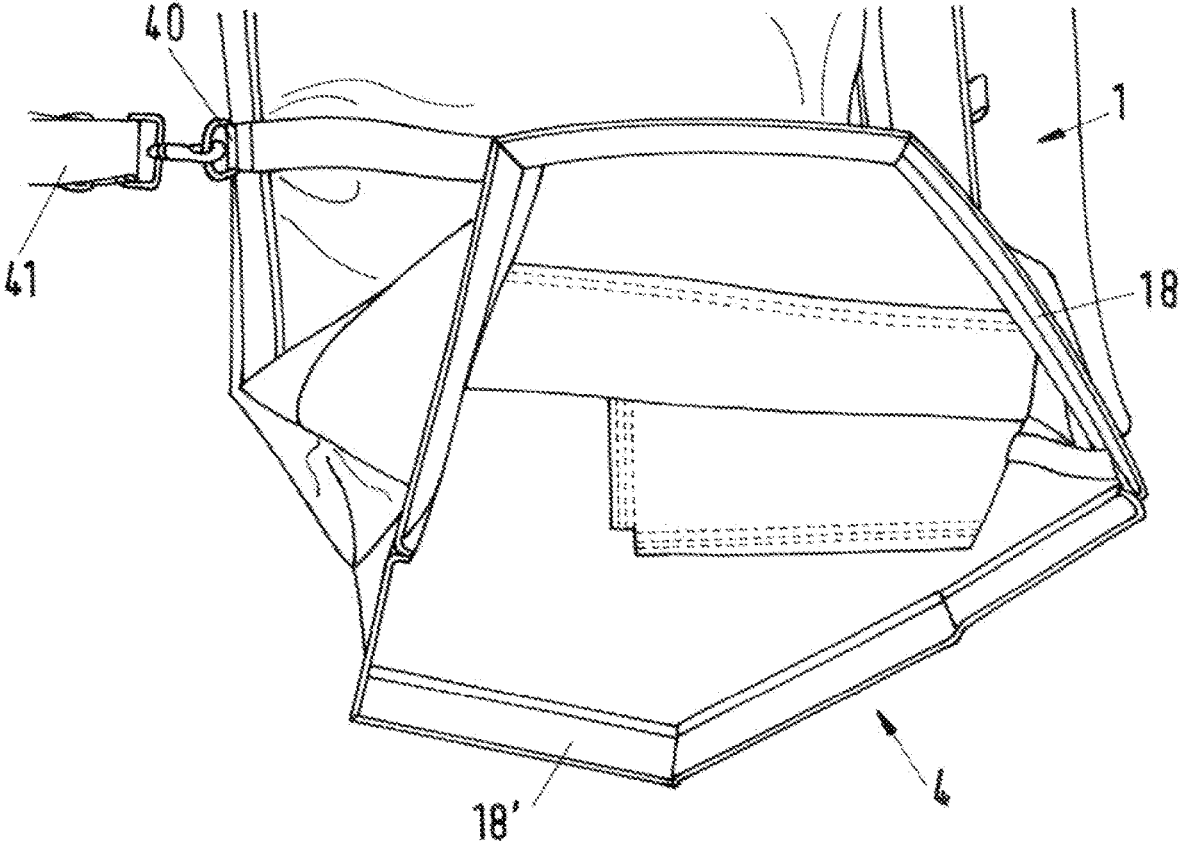

The opened emptying opening 4 is illustrated in FIG. 4. The opening edge 18 as well as the opposite opening edge 18' are reinforced with a segmented flat bar 19. By virtue of the individual segments which have been formed, the emptying opening 4 assumes a stable opening position.

It is understood that the foregoing description is that of the preferred embodiments of the invention and that various changes and modifications may be made thereto without departing from the spirit and scope of the invention as defined in the appended claims.

The invention claimed is:

1. A collecting bag for receiving material to be collected, the collecting bag comprising:

a woven-fabric cloth delimiting a receiving space, wherein the receiving space is delimited by outer edges of the collecting bag;

said woven-fabric cloth being at least partially air-permeable;

said receiving space having an inlet opening for a conveying airflow which supplies the material to be collected and an outlet opening for at least partially discharging the conveying airflow into the environment;

said receiving space having a closable emptying opening for retrieving the material to be collected;

said inlet opening being provided on a first edge of the outer edges of the collecting bag;

said emptying opening being provided on a second edge of the outer edges of the collecting bag, wherein said second edge of the outer edges is opposite to said first edge of the outer edges;

said first edge of the outer edges and said second edge of the outer edges being opposite one another at a spacing and connected to one another by way of a first longitudinal edge of the outer edges of the collecting bag and a second longitudinal edge of the outer edges of the collecting bag;

said outlet opening for at least partially discharging the conveying airflow being disposed in a side wall of the collecting bag, between said emptying opening and said inlet opening;

said outlet opening being assigned a closure element which in a closure position completely closes the outlet opening;

said outlet opening being formed by a fabric net which is held in said side wall; said closure element is a closure cloth which covers said fabric net in a planar manner;

said closure cloth being attached to said side wall except at an outflow opening; and, said outflow opening being configured to be closed by a closing flap fixed to said side wall of the collecting bag.

2. The collecting bag of claim 1, wherein said side wall defines a side wall area; and, said outlet opening defines an outlet opening area which corresponds to 10% to 20% of said side wall area.

3. The collecting bag of claim 1, wherein the collecting bag between said first edge and said second edge is divided into a first half and a second half by an imaginary central plane; said outlet opening lies in said first half; and, said inlet opening lies in said second half.

4. The collecting bag according of claim 1, wherein said outlet opening lies closer to said emptying opening than to said inlet opening.

5. The collecting bag of claim 1, wherein said outlet opening is formed by a fabric net which is held in said side wall.

6. The collecting bag of claim 1, wherein said outflow opening is co-aligned with said second longitudinal edge of said collecting bag.

7. The collecting bag of claim 1, wherein said emptying opening has at least one opening edge which is reinforced with a flat bar; said flat bar in a longitudinal direction thereof is divided into at least two mutually separate segments; and, said emptying opening is configured to be closed by folding back said at least one opening edge which is reinforced with said flat bar.

8. The collecting bag of claim 1, wherein the collecting bag in a lateral view has a rectangular basic shape with narrow sides and longitudinal sides; said first edge and said second edge are on said narrow sides; and, said first longitudinal edge and said second longitudinal edge are configured on said longitudinal sides.

9. The collecting bag of claim 1, the collecting bag, proceeding from said first edge with said inlet opening is configured so as to widen in a direction towards said second edge with said emptying opening.

10. The collecting bag of claim 1, wherein said inlet opening is configured having an inner channel section of a defined length that opens into said receiving space.

11. The collecting bag of claim 10, wherein said inner channel section widens from said inlet opening towards said receiving space.

12. The collecting bag of claim 10, wherein said inner channel section, which adjoins said inlet opening, opens into said receiving space as a diffusor.

13. A collecting bag for receiving material to be collected, the collecting bag comprising:

a woven-fabric cloth delimiting a receiving space, wherein the receiving space is delimited by outer edges of the collecting bag;

said woven-fabric cloth being at least partially air-permeable;

said receiving space having an inlet opening for a conveying airflow which supplies the material to be collected and an outlet opening for at least partially discharging the conveying airflow into the environment;

said receiving space having a closable emptying opening for retrieving the material to be collected;

said inlet opening being provided on a first edge of the outer edges of the collecting bag;

said emptying opening being provided on a second edge of the outer edges of the collecting bag, wherein said second edge of the outer edges is opposite to said first edge of the outer edges;

said first edge of the outer edges and said second edge of the outer edges being opposite one another at a spacing and connected to one another by way of a first longitudinal edge of the outer edges of the collecting bag and a second longitudinal edge of the outer edges of the collecting bag;

said outlet opening for at least partially discharging the conveying airflow being disposed in a side wall of the collecting bag, between said emptying opening and said inlet opening;

said outlet opening being assigned a closure element which in a closure position completely closes the outlet opening;

said outlet opening being formed by a fabric net which is held in said side wall; said closure element is a closure cloth which covers said fabric net in a planar manner;

said closure cloth being attached to said side wall except at an outflow opening;

an opening edge of said closure element that delimits said outflow opening being reinforced with a flat bar; and, said flat bar in a longitudinal direction thereof being divided into at least two mutually separate segments.

14. The collecting bag of claim 13, wherein said side wall defines a side wall area; and, said outlet opening defines an outlet opening area which corresponds to 10% to 20% of said side wall area.

15. The collecting bag of claim 13, wherein the collecting bag between said first edge and said second edge is divided into a first half and a second half by an imaginary central plane; said outlet opening lies in said first half; and, said inlet opening lies in said second half.

16. The collecting bag according of claim 13, wherein said outlet opening lies closer to said emptying opening than to said inlet opening.

17. The collecting bag of claim 13, wherein said outflow opening is co-aligned with said second longitudinal edge of said collecting bag.

18. The collecting bag of claim 13, wherein said emptying opening has at least one opening edge which is reinforced with a flat bar; said flat bar in a longitudinal direction thereof is divided into at least two mutually separate segments; and, said emptying opening is configured to be closed by folding back said at least one opening edge which is reinforced with said flat bar.

19. The collecting bag of claim 13, wherein the collecting bag in a lateral view has a rectangular basic shape with narrow sides and longitudinal sides; said first edge and said second edge are on said narrow sides; and, said first longitudinal edge and said second longitudinal edge are configured on said longitudinal sides.

20. The collecting bag of claim 13, the collecting bag, proceeding from said first edge with said inlet opening is configured so as to widen in a direction towards said second edge with said emptying opening.

* * * * *